United States Patent Office 3,379,208
Patented Apr. 23, 1968

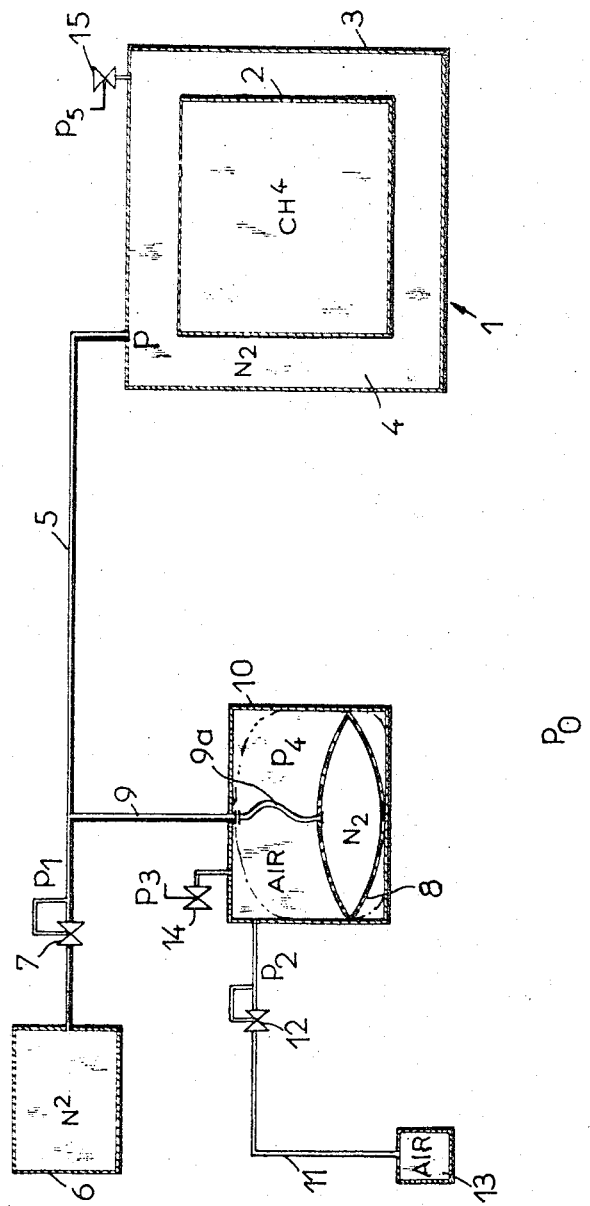

3,379,208
DEVICE FOR AUTOMATICALLY CONTROLLING THE PRESSURE OF AN ENCLOSED FLUID
Jean Alleaume, Saint-Cloud, France, assignor to Technigaz, Paris, France, a corporation of France
Filed June 1, 1965, Ser. No. 460,387
Claims priority, application France, June 1, 1964, 976,687
6 Claims. (Cl. 137—263)

ABSTRACT OF THE DISCLOSURE

An apparatus for maintaining a constant pressure in a fixed volume enclosed space containing an expansible fluid comprising, a variable volume flexible walled vessel in fluid communication with the enclosed space, a constant volume chamber containing the vessel and fluid supply and regulating means for maintaining a regulated source of pressurized expansible fluid within the chamber.

---

The present invention has essentially for its subject matter a self-adjusting method of maintaining at a substantially constant value, possibly with a predetermined tolerance, the relative pressure of an expansible fluid contained in an enclosure of substantially invariable capacity, as well as a device for carrying out or implementing the aforesaid method, and their various applications.

Existing or hitherto known methods for maintaining at a constant value between predetermined limits the pressure of a fluid such as a gas or vapor contained in an enclosure of practically constant internal volume consist in equipping said enclosure with a discharge or safety valve properly adjusted so as to open automatically when the inner pressure of said fluid becomes equal to or greater than the upper predetermined limit value of the valve setting to permit the free exhaust or discharge of one portion of said fluid from said enclosure, until the inner pressure therein falls below said upper limit value for resuming its rated value, thus reclosing the safety valve. On the other hand, the aforesaid enclosure is connected to a stand-by source of make-up or loss-compensating compressed fluid, for example through a pressure-reducing device adapted to deliver fluid to said enclosure when the inner pressure thereof falls below the predetermined lower limit value, until the pressure rises to resume its rated value lying between the aforesaid two limits. This method is objectionable in that it involves losses of fluid, in case of overpressure, which must be compensated for in case of insufficient pressure by the addition of complementary fluid, so that the installation will consume fluid, if not continuously, at least periodically or intermittently.

The problem of fluid pressure control arises more particularly in the case of the storage of fluids, whether of liquid or gaseous nature, likely to constitute certain risks or dangers owing to specific chemical properties or critical characteristics linked to their physical preservation conditions. This is notably the case of liquefied gas storage, notably at low temperature, and more particularly for example the storage of methane, these liquefied gases being contained as a rule in tanks having double walls or envelopes forming therebetween a closed insulating space filled with a preferably inert gas at certain excess pressure with respect to the surrounding atmospheric pressure.

This gas cushion at a relative excess pressure is adapted to prevent the introduction, from the outside, of combustion supporting air or gas likely, in case of accidental leakage of the fluid contained in the tank, to form therewith an explosive or detonating mixture if said fluid is combustible. The inert gas at a relative excess pressure is also useful for preventing the ingress of any humidity in vapor form into the aforesaid insulating space, for these vapors might condense or solidify when contacting the tank walls strongly cooled by the liquefied gas, thus involving a reduction in the insulating capacity of the layer surrounding the tank and constituting a primary barrier for the liquefied gas.

The relative excess pressure of the gas contained in said insulating space should necessarily remain nearly constant, at least within certain limits. Thus, this excess pressure should neither fall to the same value as the external atmospheric pressure, for this would permit the ingress of moist air, nor exceed a certain upper limit pressure beyond which the stress applied to the tank walls by this pressure would alter the shape of these walls.

The gas pressure in the aforesaid insulating space may tend to vary under the influence of various phenomena, notably a temperature variation (due for instance to the precooling of the tank intended for containing the low-temperature liquefied gas), and also a variation in the surrounding atmospheric pressure. Therefore, in case of a pressure reduction, a certain amount of gas must be delivered or injected into the insulating space, and in case of pressure increase some gas must be removed therefrom and, as far as possible, recovered, notably in the case of sea or land transport of liquefied gas. Thus for example in the case of sea transport of liquefied methane, the methane tanker is equipped with a nitrogen preservation plant adapted to supply inert gas to the insulating space surrounding the methane tanks, so that it is extremely advantageous to have the possibility of recovering this nitrogen during pressure fluctuations in the insulating space, since a renewal of inert gas stock may be uncertain, hazardous or precarious during the journey.

It is the object of the present invention to avoid or obviate the above-mentioned inconveniences and the method according to this invention is of the type consisting in drawing off by free exhaust from, or delivering to, the enclosure containing the aforesaid fluid, a predetermined quantity of said fluid respectively in case of occasional overpressure or depression. The improved method is characterized in that it consists in causing at least one fraction of the volume of said fluid to be varied in a substantially continuous manner respectively by expansion or by compression subordinate to the pressure, kept at a substantially constant value, of an external confining medium, preferably while maintaining at a substantially constant value the total mass of fluid utilized, by the fact that that portion of said fluid which is drawn off or discharged in case of excess pressure prevailing in said enclosure, is collected or recovered to constitute a feed reserve constantly available with a view to be automatically returned at least partially by being forced back into said enclosure under the influence of the pressure available in said confining medium in case of depression in said enclosure.

This invention is also concerned with a device for carrying out the method set forth hereinabove, which is characterized in that it comprises at least one auxiliary closed space having yielding or flexible, and preferably elastically deformable walls, constituting a variable-capacity pocket or chamber communicating permanently through at least one duct with the aforesaid enclosure and subject and responsive to a predetermined, substantially constant outer pressure provided by the ambient or surrounding medium. This pocket may consist, notably, of a kind of bladder or membrane-like bag of rubber or equivalent elastomer, having a wall thickness sufficient to withstand wear by abrasion and the various types of strain applied thereto in actual operation.

This pocket is located externally of the enclosure containing the fluid of which it is desired to control the pressure and its operation is particularly simple and efficient since in case of overpressure in said enclosure a certain portion of the fluid contained therein can escape freely therefrom and flow into said elastic pocket so as to inflate same while overcoming on the one hand the elastic force exerted by the expansible walls of said pocket and on the other hand the pressure of the ambient or environmental medium, for example the atmospheric medium, surrounding said pocket. This transfer of one fraction of the fluid contained in said enclosure to the aforesaid pocket takes place until a state of balance is attained whereby the pressure prevailing in said enclosure has been reduced to its normal or desired value. Conversely, in case of depression in said enclosure, at least one fraction of the fluid contained in said pocket is forced, by the pressure forces acting upon the fluid volume contained in said pocket, into said enclosure until the requisite desired or rated normal pressure is restored therein.

However, if said pocket is surrounded only by the ambient atmosphere, this pocket as a rule is unable to perform by itself the function allotted thereto as explained hereinabove; in fact, the thickness of its walls, which is subordinate to the mechanical strength to be necessarily imparted thereto, is in most instances too high, thus making the pocket too rigid to permit its elastic deformation, that is, its expansion or contraction, with a sufficient facility, considering the generally low value of the fluid pressure therein.

To avoid this inconvenience and according to a further feature characterizing this invention, the aforesaid pocket is disposed in an isolating enclosure in which a substantially constant pressure is maintained to constitute the aforesaid external pressure and wherein said pocket is adapted to expand by swelling or inflation, or to flatten under the influence of said external pressure.

This isolating enclosure is filled with an auxiliary fluid such as a gas, for example air, which is advantageously kept at a relative overpressure, that is, at a pressure in excess of the atmospheric pressure prevailing externally of said isolating enclosure, whereby this overpressure will facilitate the deformations of said pocket, which may thus either expand until it occupies substantially the whole of the inner space available in said isolating enclosure, or be flattened or collapse by the action of said overpressure.

Finally, the present invention also contemplates the various applications of the above-described method and device, as well as the apparatus or equipments provided with devices of this type and more particularly enclosures or containers, such as tanks, vats, cisterns, caissons, vessels and the like, intended to contain fluids and surrounded by a closed insulating space filled with a preferably inert gas at a relative overpressure with respect to the surrounding or ambient atmosphere.

Other features and advantages of the present invention will appear as the following description proceeds with reference to the accompanying drawing given by way of example illustrating diagrammatically a typical embodiment of the invention and wherein the single figure illustrates an installation applied to a tank containing a liquefied gas, for example liquid methane.

In the exemplary form of embodiment illustrated in the drawing, the reference numeral 1 denotes a tank adapted to contain liquid methane. This tank consists advantageously of an inner tank structure proper 2 adapted to constitute a fluid-tight primary barrier and of an outer envelope 3 surrounding completely the inner tank 2 and somewhat spaced therefrom to constitute a secondary, similarly fluid-tight, barrier.

The intermediate space or gap 4 bounded by the outer wall of tank 2 and the inner wall of envelope 3 may, if desired but not compulsorily be filled with heat-insulating materials. The insulating space 4 contains an inert gas such as nitrogen kept at an overpressure with respect to the surrounding atmospheric pressure, that is, the pressure prevailing outside of the envelope 3. To this end, the insulating space 4 is connected by means of at least one feed line, duct or pipe 5 to a source of inert gas (nitrogen) 6 delivering inert gas at a sufficient pressure through a pressure reducing apparatus or like device 7.

A resiliently deformable pocket 8 is in constant communication through a suitable duct or branch pipe 9 with said insulating space 4. To this end, the pocket may be directly connected by means of said duct 9 to the insulating space 4 or, according to the example illustrated in the drawing, the branch pipe 9 may be connected to the aforesaid feed line 5 downstream of the pressure-reducing device 7, that is, at a point lying between said pressure-reducing device 7 and the tank 1. The pocket 8 is disposed within an auxiliary fluid-tight and completely sealed isolating enclosure 10 connected through a pipe line 11 and a pressure-reducing device 12 to a source 13 of suitable auxiliary compressed fluid, for example air.

The enclosure 10 is advantageously provided with a safety valve or the like 14 and the envelope 3 is advantageously provided with a safety valve or the like 15.

If $p$ denotes the pressure which it is desired to maintain in the insulating space 4, $p_0$ being the surrounding atmospheric pressure, $p_1$ the nitrogen pressure at the outlet of pressure-reducing device 7, $p_2$ the pressure of the compressed air delivered by the pressure-reducing device 12, and if $p_3$ and $p_5$ denote respectively the set or opening pressure values of safety valves 14 and 15, and $p_4$, the air pressure prevailing in the enclosure 10 externally of pocket 8, the pressure $p$ should range between values $p_1$ and $p_3$, and pressure $p_4$ between values $p_2$ and $p_3$. These requirements are expressed mathematically by the following inequalities:

$$p_0 < p_1 \leqslant p \leqslant p_3 < p_5$$
$$p_0 < p_1 < p_2 \leqslant p_4 \leqslant p_3 < p_5$$

All these pressure values designate relative or gauge pressures; in other words, they are expressed as the excess pressure above the atmospheric pressure $p_0$.

By way of example, the following values may be taken for the aforesaid relative pressures:

$p_1 = 2$ grams/sq. cm.
$p_2 = 4$ grams/sq. cm.
$p_3 = 6$ grams/sq. cm.

The inner volume of enclosure 10 which surrounds and encloses the elastic pocket 8 represents a predetermined fraction, for example about 8.5%, of the volume of the insulating space 4 surrounding the tank 2 to take due account of the extreme barometric variations likely to occur doing a sea voyage, in the case of a methane tanker, from the loading port to the unloading ports, or in land storage installations.

There is shown in thick lines the configuration of the pocket 8 in an intermediate condition, and in chain-dotted lines its configuration in the maximum expanded or inflated condition. The portion 9a of the pipe leading into the pocket 8 and within the enclosure 10 is advantageously comprised of a flexible hose, or a deformable duct such as a bellows or the like, to permit of following without hindrance the deformations of the elastic pocket 8.

Of course, this invention is also applicable to any container such as 3, for example filled completely with any fluid and notably without any inner tank.

Besides, it is clear that the present invention should not be construed as being limited by the specific form of embodiment shown, described and suggested herein, as many modifications may be brought thereto without departing from the scope of the invention as set forth in the appended claims.

What I claim is:

1. A device for automatically controlling the pressure of an expansible pressure fluid contained in an enclosed space of substantially invariable capacity, comprising: at least one closed collapsible fluid-tight vessel having flexible walls throughout thereof defining therein a variable capacity containing a variable amount of said pressure fluid; duct means connecting said enclosed space and vessel for constant communication therebetween; a closed fluid-tight confining chamber of substantially invariable capacity which is a fraction of that of said enclosed space, said chamber containing said vessel; and means for filling said chamber with an auxiliary pressure fluid medium kept at a substantially constant predetermined pressure and fully surrounding said vessel, said vessel being adapted to be at least partially inflated and deflated alternatively so as to expand and be flattened, respectively, by the combined action of said pressure fluid and auxiliary pressure fluid medium.

2. A device according to claim 1, comprising a source of pressure fluid connected through pressure-reducing valve means in parallel to said enclosed space and vessel; a source of auxiliary pressure fluid medium connected through further pressure-reducing valve means to said chamber; and safety valve means provided on said enclosed space and chamber, respectively.

3. A device according to claim 2, wherein said source of pressure fluid is connected through said pressure-reducing valve means to said duct means.

4. A device according to claim 2, wherein the pressure setting of the safety valve means of said enclosed space is higher than the pressure setting of the safety valve means of said chamber and said latter pressure setting is at least equal to the rated pressure of said pressure fluid which in turn is at least equal to the pressure delivered by said pressure-reducing valve means associated with said source of pressure fluid, whereas the pressure in said chamber is at most equal to the pressure setting of the safety valve means of said chamber and at least equal to the pressure supplied by said further pressure-reducing valve means associated with said source of auxiliary pressure fluid medium, said latter pressure being above the pressure delivered by said first-named pressure-reducing valve means, and all pressures being above atmospheric pressure.

5. A device according to claim 1, wherein at least that portion of said duct means which is inside of said chamber to connect to said vessel consists of a deformable hose pipe.

6. A device according to claim 1, wherein said vessel consists of a bag made from resiliently deformable material.

References Cited

UNITED STATES PATENTS

| | | | |
|---|---|---|---|
| 2,200,610 | 5/1940 | Weichsel | 220—88 |
| 2,732,095 | 1/1956 | Fashay | 220—88 |
| 2,948,432 | 8/1960 | Bodley | 220—85 |

FOREIGN PATENTS 946,781    8/1956    Germany.

M. CARY NELSON, *Primary Examiner.*

W. CLINE, *Assistant Examiner.*